F. H. FELT.
SCALE.
APPLICATION FILED DEC. 12, 1911.

1,046,063.

Patented Dec. 3, 1912.
2 SHEETS—SHEET 1.

Witnesses

Inventor
F. H. Felt
By Harry Ellis Chandler
Attorneys

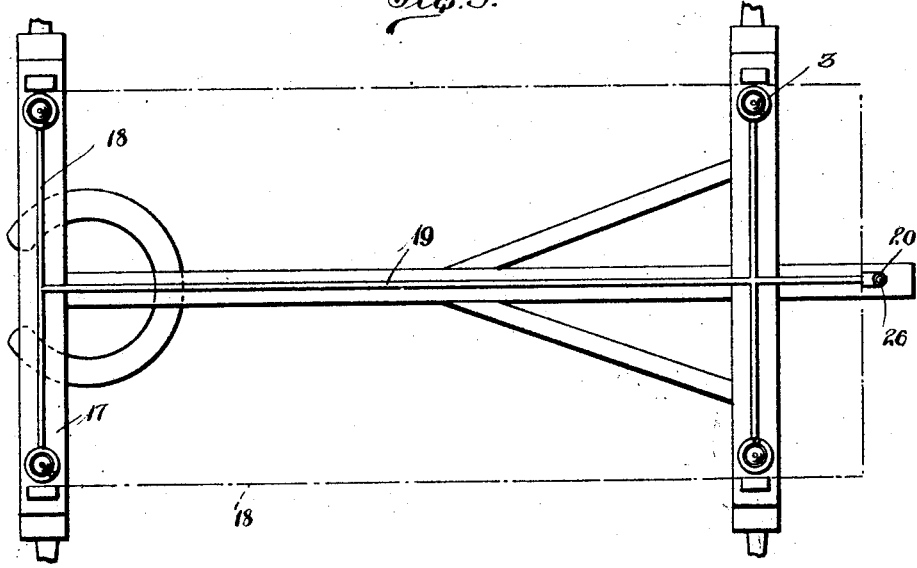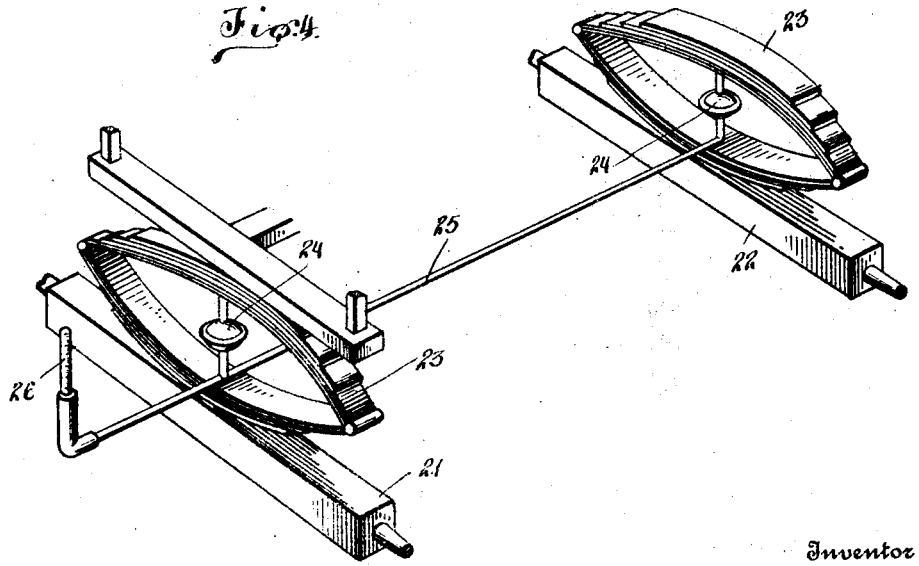

UNITED STATES PATENT OFFICE.

FREDERICK H. FELT, OF LONG ISLAND, KANSAS.

SCALE.

1,046,063.  Specification of Letters Patent.  Patented Dec. 3, 1912.

Application filed December 12, 1911. Serial No. 665,208.

*To all whom it may concern:*

Be it known that I, FREDERICK H. FELT, a citizen of the United States, residing at Long Island, in the county of Phillips and State of Kansas, have invented certain new and useful Improvements in Scales, of which the following is a specification.

This invention relates to scales, and has for its object to produce a device of this character provided with a liquid indicator.

A further object of the invention is to construct a scale which may be employed for weighing articles upon being placed upon a wagon, or the scale may be so formed as to be adapted for use with equal success in stores.

With these and other objects in view, the invention consists in certain novel features of construction, combination and arrangement of parts as will be hereinafter fully described and claimed.

Figure 1:
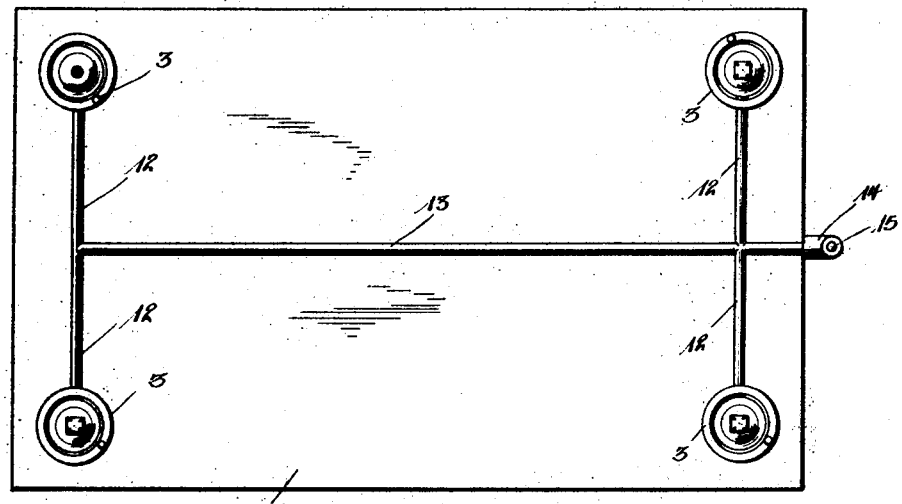
Figure 2:
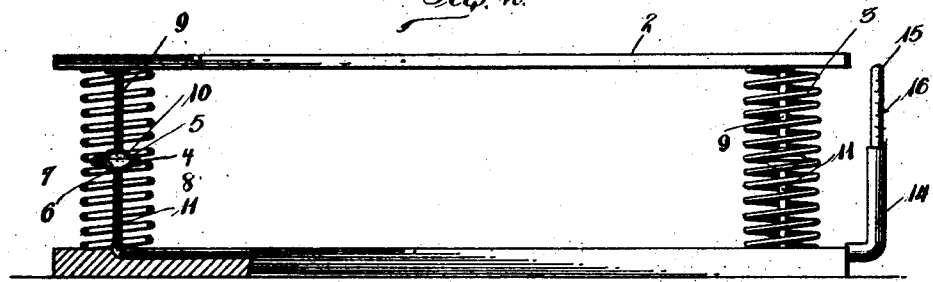
Figure 5:
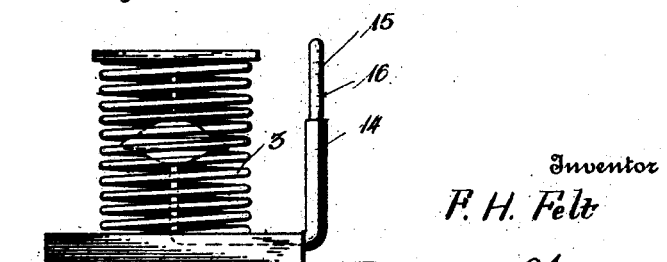

In the drawings: Figure 1 is a top plan view of a platform scale embodying the invention, the platform removed. Fig. 2 is a side elevation, partly in section, the platform being in place. Fig. 3 is a modified form of the invention showing the same arranged upon the bolsters of a vehicle. Fig. 4 is a perspective view of another modified form of the invention, the same being applied between the elliptical springs of a cart. Fig. 5 is a side elevation the same showing the invention applied to a desk scale.

Referring to the drawings, and particularly to Figs. 1 and 2, there is shown a base 1 having a platform 2 arranged thereabove and spaced therefrom by helical springs 3, a spring being arranged between each of the corners of the base and platform, said springs being secured thereto in any suitable manner.

Arranged within the helices of each of the springs 3 is a diaphragm chamber 4, the same consisting of upper and lower concavo convex disks 5 and 6 respectively, the upper disk 5 being provided with a peripheral groove 7 and in which the peripheral flange 8 of the lower disk 6 is clamped. Rigidly secured to the central portion of the disk 5 is a rod 9, the outer end of which being secured in a suitable manner to the under surface of the platform 1.

An opening 10 is formed in each lower disk 6, said openings being in communication with the vertical tubes 11, the lower ends of said tubes resting upon the base 1 and rigidly supported thereby in any suitable manner. Leading from the tubes 11 are branch pipes 12, said pipes being in communication at their outer ends with a pipe 13, the outer end of said pipe projecting slightly beyond the side edges of the base and platform. An elbow 14 is secured to the pipe 13 and has its upper end threaded for the reception of the threaded lower end of a glass indicator tube 15, the same being provided with an index 16 which denotes the weight of the article placed upon the platform 2.
Liquid is introduced through the elbow 14, the quantity being sufficient to fill all of the diaphragm chambers 4, so that when weight is placed upon the platform 2 the same will compress the springs 4, and at which time the diaphragm chambers will be acted upon to expand the liquid and cause the same to rise in the indicator 15 and denote the weight of the article or articles upon the platform.
In Fig. 3 the invention is shown as applied between the bolsters 17 and bottom 18 of a wagon, the same principle being involved, that is to say branch pipes 18 are employed, and have communication with a pipe 19, and to which is secured the glass indicator 20, the same being so arranged as to be in a position for ready reference to the index thereof.

In Fig. 4, there is shown the front and rear axles 21 and 22 of a vehicle, having mounted thereon the usual elliptical springs 23, and between which the diaphragm chambers 24 are positioned, the same having communication with a pipe 25, to one end of which is secured the glass indicator tube 26. In this form of the invention it will be noted that the helical springs are eliminated, the action of the springs 23 being the same.
The liquid used is preferably mercury, but it will be of course understood, that any suitable liquid may be substituted therefor, such as pure alcohol, or water mixed with alcohol, it being of course necessary that the liquid used can withstand freezing temperature.

From this construction it will be seen that a scale has been produced which eliminates the use of weights, the weight of articles being indicated instantaneously when applied upon a platform or wagon body or the like.

What is claimed is:

1. A scale comprising a base, a platform arranged above the base, coil springs interposed between said base and platform, and diaphragm chambers located within the springs, pipes leading from said chambers, a pipe supported upon the base and having an indicator tube connected to one end, said pipe having communication with said pipes, whereby when said springs are compressed the diaphragms will be similarly operated to force liquid from said chambers to the indicator.

2. A scale comprising a base, a platform arranged above said base, coil springs arranged between said base and platform, diaphragm chambers inclosed by said springs, rods connecting the platform and upper surfaces of the diaphragm chambers, tubes leading from the under side of the chambers and having their lower ends supported upon the base, a pipe supported upon the base and having an indicating tube secured to one end, branch pipes leading from said tubes and in communication with the pipe, whereby when the springs are compressed the diaphragm chambers will be similarly acted upon to force the liquid contained therein to the indicator tube.

In testimony whereof I affix my signature, in the presence of two witnesses.

FREDERICK H. FELT.

Witnesses:
MELVIN W. SIDES,
VERNE E. DYATT.